(12) United States Patent
Yang

(10) Patent No.: US 10,532,331 B2
(45) Date of Patent: Jan. 14, 2020

(54) ARTIFICIAL-WHIRLPOOL GENERATOR

(71) Applicants: Shi Chun Yang, Ulsan (KR); KOREA AQUOSYS CO., LTD., Ulsan (KR)

(72) Inventor: Shi Chun Yang, Ulsan (KR)

(73) Assignees: Shi Chun Yang (KR); KOREA AQUOSYS CO., LTD. (KR)

( * ) Notice: Subject to any disclaimer, the term of this patent is extended or adjusted under 35 U.S.C. 154(b) by 0 days.

(21) Appl. No.: 15/825,431

(22) Filed: Nov. 29, 2017

(65) Prior Publication Data

US 2018/0078910 A1    Mar. 22, 2018

Related U.S. Application Data

(63) Continuation of application No. PCT/KR2015/009414, filed on Sep. 7, 2015.

(30) Foreign Application Priority Data

Jun. 10, 2015    (KR) .................. 10-2015-0081633

(51) Int. Cl.
*B01F 3/04*    (2006.01)
*C02F 7/00*    (2006.01)
(Continued)

(52) U.S. Cl.
CPC ........ *B01F 3/04617* (2013.01); *B01F 5/0068* (2013.01); *C02F 3/16* (2013.01);
(Continued)

(58) Field of Classification Search
CPC .............. B01F 3/04617; B01F 5/0068; B01F 2215/0052; C02F 3/16; C02F 3/205; C02F 7/00
See application file for complete search history.

(56) References Cited

U.S. PATENT DOCUMENTS 2,571,219 A * 10/1951 De Cew .................. D21D 5/26
                                                                95/260
2,827,268 A *  3/1958 Staaf .................... B01F 3/0853
                                                                210/170.09
(Continued)

FOREIGN PATENT DOCUMENTS

CN        103539211 A      1/2014
KR        20-0380365 Y1    3/2005
(Continued)

OTHER PUBLICATIONS

International Search Report (PCT/KR2015/009414), WIPO, dated Mar. 10, 2016.

*Primary Examiner* — David C Mellon
(74) *Attorney, Agent, or Firm* — Park & Associates IP Law, P.C.

(57) ABSTRACT

An artificial-whirlpool generator includes a whirlpool generating member including at least one water inlet, a whirlpool generating chamber communicating with the water inlet, and a whirlpool outlet that is formed at a lower end portion of the whirlpool generating member and communicates with the whirlpool generating chamber; a position-fixing means that fixes the whirlpool forming member such that the entirety of the whirlpool generating member or only a portion of the whirlpool generating member, including the whirlpool outlet is submerged; and a swirling flow forming unit that forces water in a waterbody to be introduced into the whirlpool generating chamber through the water inlet and rotates the introduced water in one direction around an axle provided at a center portion of the whirlpool generating chamber to form a whirlpool that descends toward the whirlpool outlet.

6 Claims, 12 Drawing Sheets

(51) Int. Cl.
*B01F 5/00* (2006.01)
*C02F 3/16* (2006.01)
*C02F 3/20* (2006.01)

(52) U.S. Cl.
CPC .............. *C02F 3/205* (2013.01); *C02F 7/00* (2013.01); *B01F 2215/0052* (2013.01)

(56) References Cited

U.S. PATENT DOCUMENTS

| | | | | |
|---|---|---|---|---|
| 3,003,705 | A * | 10/1961 | Johnson | B01F 5/0057 239/399 |
| 3,099,986 | A * | 8/1963 | Guelfi | A61H 33/026 4/541.6 |
| 4,328,175 | A * | 5/1982 | Roeckel | B01F 3/04609 261/91 |
| 4,613,431 | A * | 9/1986 | Miller | B03D 1/1418 209/169 |
| 4,724,086 | A | 2/1988 | Kortmann | |
| 5,021,154 | A * | 6/1991 | Haegeman | C02F 3/165 210/221.2 |
| 5,755,976 | A | 5/1998 | Kortmann | |
| 5,874,003 | A * | 2/1999 | Rose | B01D 21/0018 210/122 |
| 7,862,302 | B2 * | 1/2011 | Harman | B01F 3/04595 415/206 |
| 9,010,734 | B1 * | 4/2015 | Vlasak | B01F 5/0057 261/36.1 |
| 2005/0280167 | A1 * | 12/2005 | Hills | B01F 3/04539 261/87 |
| 2011/0147289 | A1 | 6/2011 | Kortmann | |
| 2013/0327721 | A1 * | 12/2013 | Grasa | B01F 3/04531 210/758 |

FOREIGN PATENT DOCUMENTS

| | | |
|---|---|---|
| KR | 10-2012-0123863 A | 11/2012 |
| KR | 10-1334446 B1 | 11/2013 |
| KR | 10-2014-0020592 A | 2/2014 |
| KR | 10-1453730 B1 | 10/2014 |
| KR | 10-1502048 B1 | 3/2015 |

* cited by examiner

ARTIFICIAL-WHIRLPOOL GENERATOR

REFERENCE TO RELATED APPLICATIONS

This is a continuation of International Patent Application PCT/KR2015/009414 filed on Sep. 7, 2015, which designates the United States and claims priority of Korean Patent Application No. 10-2015-0081633 filed on Jun. 10, 2015, the entire contents of which are incorporated herein by reference.

FIELD OF THE INVENTION

The present invention relates to an artificial-whirlpool generator that can improve the quality of various waterbodies such as lakes, dams, and large-scale water tanks.

BACKGROUND OF THE INVENTION

In stagnant waterbodies such as water retained in lakes, dams, large-scale water tanks, the level of dissolved oxygen (DO) is likely to decrease as the depth of water bodies increases. The decreased dissolved oxygen arises due to consumption of dissolved oxygen that is attributable to action of aerobes or oxidation of reductive matter in water. Another reason of the decreased dissolved oxygen in deep water may be the layered structure of a waterbody. That is, a cold water mass that is located in deep water and has a high density prevents oxygen from entering into the waterbody. When the amount of organic materials and reductive materials introduced into a waterbody increases, an anoxia or hypoxia region expands throughout the waterbody, changing the food chain, endangering aquatic ecosystems, and destroying self-purification ability of the waterbody. As a result, the quality of water is deteriorated.

In order to solve this problem, several methods have been performed to increase the DO level in a middle or lower layer portion of a waterbody, thereby expanding an aerobic region in a benthic ecosystem and restoring the entire ecosystem by putting air into the lower layer portion of the waterbody such as a polluted lake.

The most frequently performed method is a method of installing an air supply pipe and an air diffuser in a lower layer of a waterbody and transferring air into the lower layer of the waterbody through the air supply pipe and the air diffuser. In this case, air bubbles form a thin air stream in water and rapidly rise to the surface of water along with water. Therefore, a retention time of air in water is very short. Furthermore, the surface contact area of air bubbles that come in contact with water is very small. In addition, mixing effect between water and air bubbles is limited. For these reasons, oxygen transfer efficiency to a waterbody is low and the method is ineffective to supply oxygen to a deep region of a waterbody in which oxygen is substantially needed. Furthermore, when a waterbody is deep, it is necessary to supply compressed air to the waterbody. Therefore, when the waterbody is deep and wide like a large lake, aeration of the waterbody is very costly.

Korean Patent No. 10-1334446 (Nov. 29, 2013), 10-1453730 (Oct. 22, 2014), U.S. Pat. No. 4,724,086 (Feb. 9, 1988), and U.S. Pat. No. 5,755,976 (May 26, 1998) disclose a technology by which a pipe duct is installed between a lower layer and an upper layer of a water system and water in either one layer is pumped to the other layer to solve the problem of a hypoxia state occurring in the lower layer of the water system. U.S. Patent Application Publication No. 2011/0147289 (published on Jun. 23, 2011) discloses a method of circulating water between a lower layer and an upper layer of a waterbody by installing a twisted rotational blade (propeller) in the waterbody instead of the pipe duct and rotating the twisted rotational blade using a driving source to form an ascending water flow and a descending water flow.

The former method, which circulates water using the pipe duct, incurs a low installation cost when it is applied to a small-scale waterbody but is very costly in terms of installation cost and operation cost when it is applied to a large-scale waterbody such as a large lake or a dam reservoir. Therefore, it is difficult to use the former method for aeration of a large-scale waterbody. The later method, which circulates water using a propeller, forms a parallel flow 13 that moves forward when a propeller 12 is rotated by a driving device 11 as illustrated in FIG. 1. At this point, since resistance that a fluid receives is increased, water conveyance efficiency is decreased when the method is used for a deep waterbody.

On the other hand, a natural river has a riffle-pool sequence because water forms a curved stream due to various natural conditions. In a pool of a curved stream, a whirlpool is formed due to the effect of the flow of water. The whirlpool erodes the bed of a river in a different amount according to the flowrate of water at the curved portions of a river during flooding. Soil, sand and pebbles that are eroded from the bed of a river accumulate in a position where the whirlpool is weak, forming a riffle there. In pools of a natural river, a whirlpool is unfailingly formed. Therefore, even when a pool is deeper, a correspondingly larger and stronger whirlpool is formed, so that surface water which is high in DO level and is rich in organic materials is circulated to reach the bottom of the pool in a river. Therefore, a good aerobic ecosystem can always be maintained at the bottom of the pool, so that even a large fish which consumes a large amount of oxygen can live deep in the waterbody.

Referring to FIG. 2, it is seen that riffles 21 and pools 22 repeatedly appear in a natural river as curved portions do. As illustrated in FIG. 3, as for the flow of water in a pool (refer to 22 of FIG. 2), a water flow 31 that flows straight into a curved portion of a river collides with the bank at the curved portion of a river, forming a whirlpool 32. The whirlpool transfers surface water in which dissolved oxygen is sufficient to the bottom of a river, thereby activating a benthic ecosystem.

When a whirlpool is artificially generated in a stagnant waterbody such as a lake, a hypoxia layer near the bottom of the waterbody is broken. Therefore, a benthic ecosystem can be restored, the total amount of phytoplankton can be controlled due to active athrocytosis of shellfish and microfauna, and nutritive components in water can accumulate and be stored in animal bodies and can be used in the food chain. Through this process, the quality of water can be improved.

Basically, an artificial whirlpool can be formed in water by forming a horizontal flow and by using a disturbing plate with which the horizontal flow obliquely collides. However, development of an apparatus that can prevent wasteful energy consumption attributable to diffusion of flow in a process of forming a whirlpool and can improve efficiency of formation of a whirlpool is still required.

As described above, in a deep waterbody such as a lake, when solving the problem of expanding anoxia and hypoxia region in the system, which increases the amount of products of anaerobic degradation and accelerates the collapse of self-purification ability of a waterbody, conventional methods of increasing the DO level in a middle or lower layer of a waterbody are likely to have the following problems.

The first method in which an air supply pipe and an air diffuser are installed in a lower layer of a waterbody and air is transferred to the lower layer of the waterbody through the air diffuser to increase the level of dissolved oxygen, has the problem of low oxygen transfer efficiency due to (a) a short retention time of air in water attributable to formation of a thin stream of air bubbles and fast ascending of air bubbles toward the surface of water along with water, (b) a limited surface contact area with water, and (c) a limited mixing and contact effect between water and air bubbles. In addition, the method is difficult to achieve the goal of supplying oxygen to a lower layer of a waterbody in which oxygen is substantially needed. Furthermore, since it is necessary to transfer compressed air when a waterbody to be aerated is deep, high cost incurs in aerating a large lake.

The second method in which a pipe duct is installed between a lower layer and an upper layer of a waterbody and water is circulated by pumping water in any one layer to the other layer using a driving source to break a hypoxia state in the lower layer is highly costly in terms of equipment installation and operation when it is applied to a large lake or a dam reservoir; however, the method only incurs a small equipment cost when it is applied to a small waterbody.

According to the third method in which a tortile rotational blade (propeller) is installed instead of a pipe duct in water and water is circulated between a lower layer and an upper layer by forming an ascending flow or a descending flow by rotating the propeller with driving force, parallel flows are formed when the propeller is operated, greatly increasing resistance that a flowing waterbody receives. Therefore, when this method is applied to a deep waterbody with a depth of several tens of meters, water circulation efficiency is too low to apply to water treatment.

In addition, to purify treated water obtained from a biological reaction tank for treating sewage or waste water, an air diffusing pipe is installed in a lower portion of the reaction tank to supply dissolved oxygen to the treated water. That is, the dissolved oxygen activates metabolism of aerobic microorganisms, thereby purifying water. In this case, when the size of the reaction tank is increased, a hypoxia region is formed in the lower portion of the reaction tank, thereby lowering purification and treatment efficiency. Therefore, there is still room for improvement in this method and the third method.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an object of the present invention is to provide a cost-effective apparatus (artificial-whirlpool generator) that can cause water in an upper layer of a waterbody in which dissolved oxygen and organic materials are present in sufficient amounts to move to a lower layer of a waterbody that is polluted and thus needs to be improved in terms of water quality. Another object of the present invention is to provide a cost effective artificial-whirlpool generator that can be applied to a large-scale waterbody due to cost effectiveness that can be achieved by improving water transfer and mixing efficiencies and reducing installation cost.

Problems to be solved by the invention are not limited thereto and people ordinarily skilled in the art will appreciate other problems to be solved from the following description.

According to one aspect, there is provided an artificial-whirlpool generator including: a whirlpool generating member having at least one water inlet, a whirlpool generating chamber communicating with the water inlet, and a whirlpool outlet that is formed at a lower end portion of the whirlpool generating member and communicates with the whirlpool generating chamber; a position-fixing means that fixes the whirlpool forming member such that the entirety of the whirlpool generating member or a portion of the whirlpool generating member, including the whirlpool outlet, is submerged; and a swirling flow forming unit that forces water in a waterbody to be introduced into the whirlpool generating chamber through the water inlet and rotates the introduced water in one direction around an axle provided at a center portion of the whirlpool generating chamber to form a whirlpool that descends toward the whirlpool outlet.

The term "whirlpool" may be defined as a water flow that helically moves forward while eddying and the term "swirling flow" may be defined as a water flow that cyclically moves in place while eddying.

The whirlpool generating chamber may have a circular cross section. For example, the whirlpool generating member may be an empty vessel having a cylinder shape, a truncated cone shape, or a jar shape all of which are open at both upper and lower ends thereof or have one closed end, so that the whirlpool generating chamber in the whirlpool generating member can have a circular cross section. When a portion of an upper end or the entire upper end of the whirlpool generating member is open, the open upper end of the whirlpool generating member may serve as the water inlet.

The position-fixing means anchors the artificial-whirlpool generator so as not to sink to a bottom of the waterbody, to float away, or to rotate by torque during operation of the whirlpool generator. The position-fixing means may be piles that are driven into the bottom of the waterbed or a stand connected to a surrounding structure or buoy.

The swirling flow forming unit that causes a change in a stagnant state or a flow direction in stagnant or flowing water and rotates the water in one direction in the whirlpool generating chamber may include a connection pipe that introduces water (preferably, water in a surface layer) of the waterbody into the whirlpool generating chamber in a direction that deviates from the center portion (axle at the center) of the whirlpool generating chamber and rotates the water introduced into the whirlpool generating chamber in one direction at predetermined speed. To this end, the water inlet may be formed in a circumferential surface of the whirlpool generating member, and the connection pipe may be connected to the water inlet formed in the circumferential surface of the whirlpool generating member. Preferably, the connection pipe is connected to the whirlpool generating chamber in a direction of tangent.

The swirling flow forming unit may further include a driving force providing means that provides force (energy) to draw water in the waterbody through the connection pipe and to introduce the water into the whirlpool generating chamber. The driving force providing means may be a type that includes a recirculation pump or a motor pump.

The swirling flow forming unit may not include the connection pipe but may include the driving force providing means. In this case, the recirculation pump or motor pump that constitutes the driving force providing means may be installed to draw water from a side of the water inlet formed in the circumferential surface of the whirlpool generating member and to force the water to be introduced into the whirlpool generating chamber while flowing in a direction that deviates from the center of the whirlpool generating chamber.

Alternatively, the swirling flow forming unit may include an impeller installed within the whirlpool generating chamber. The swirling flow forming unit may further include a driving force providing means that rotates the impeller to draw water in the waterbody and forces the water to be introduced into the whirlpool generating chamber. In this case, the driving force providing means may be a type including an electric motor or a type including a wind turbine that uses wind force. According to conditions in which an embodiment is reduced to practice, the swirling flow forming unit may further include the connection pipe along with the impeller and the driving force providing means (electric motor, windmill turbine).

Solutions to solve the problems may be concretely and clearly understood through embodiments to be described below and the attached drawings. In addition, various solutions other than the above solutions may be further provided.

The artificial-whirlpool generator according to the preferred embodiment of the present invention can be manufactured in a simple manner and at low cost. The artificial-whirlpool generator can minimize waste of energy attributable to expansion of a water flow in the middle of generation of an artificial whirlpool.

In addition, it is possible to form a strong whirlpool by making the swirling flow concentrated within the whirlpool generating member. Therefore, it is possible to transfer a large amount of surface water to a deep water layer and mix them with each other, thereby economically breaking the hypoxia state in a lower layer of a waterbody. As a result, it is possible to recover a benthic ecosystem and improve water quality.

DETAILED DESCRIPTION OF THE INVENTION

Figure 1:
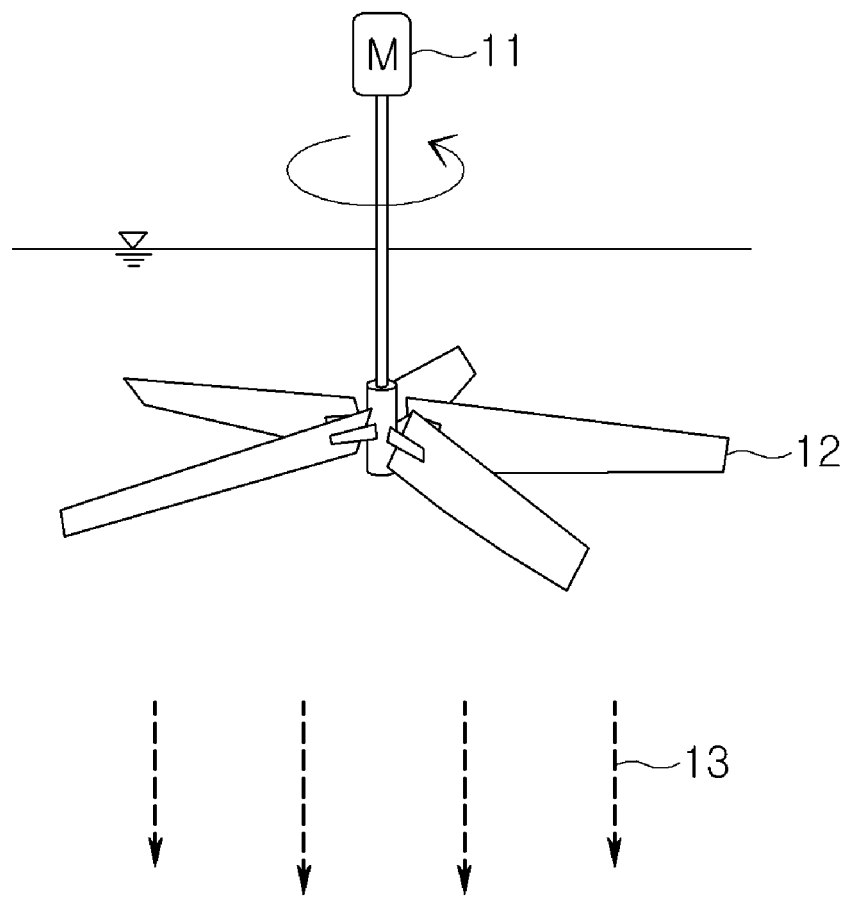
FIG. 1 is a schematic view illustrating a propeller-type water circulating apparatus according to a related art.
Figure 2:
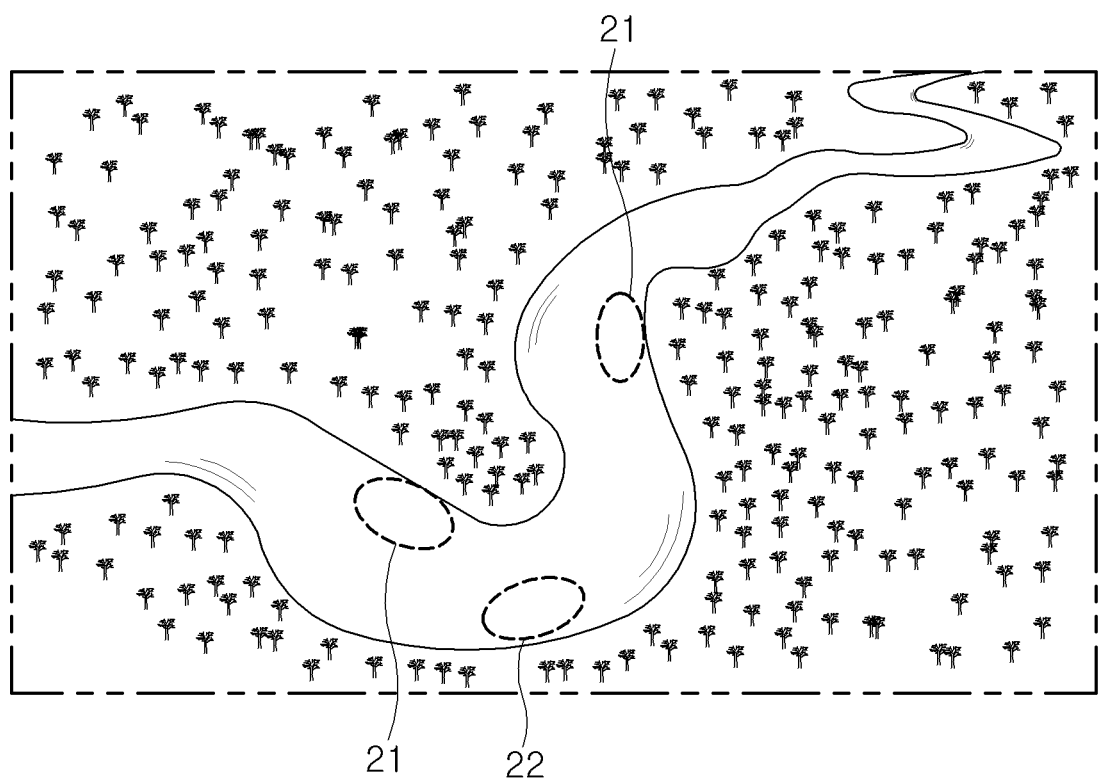
FIG. 2 is a diagram illustrating riffles and pools occurring in a natural river.
Figure 3:
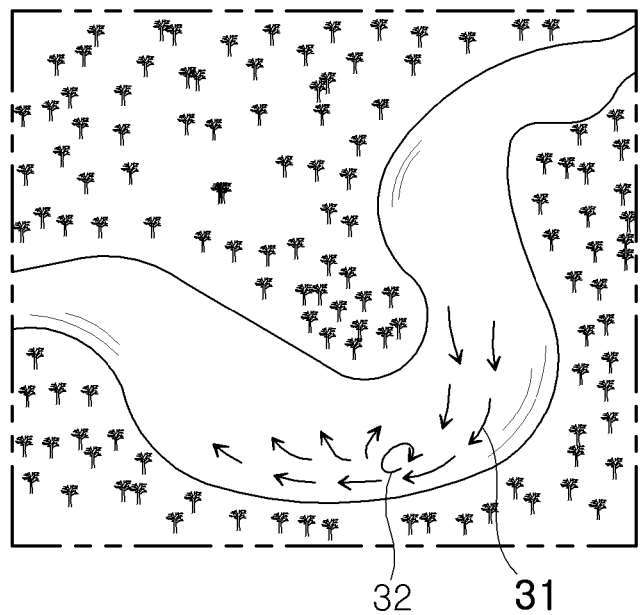
FIG. 3 is a diagram illustrating a whirlpool that occurs in the pools of FIG. 2.
Figure 4:
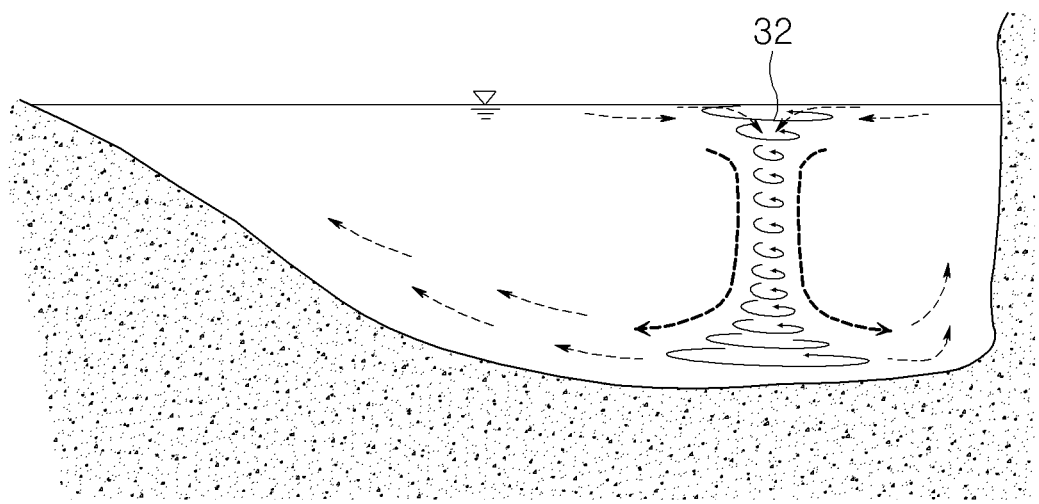
FIG. 4 is a cross sectional view illustrating a waterbody in the pools of FIG. 3.

Hereinafter preferred embodiments of the present invention will be described with reference to the accompanying drawings. Accordingly, sizes, thickness of lines, etc. of components in the drawings to which reference is made to describe embodiments may be exaggerated to make the description clearer. Since the terms that are used herein to describe embodiments of the present invention are defined in compliance with functions used in the present invention, the terms may be differently interpreted according to users, intensions of operators, customs, etc. Therefore, the terms should be preferably interpreted in view of the entirety of the present specification.

The present invention relates to an artificial-whirlpool generator that can restore health of an aquatic ecosystem in a relatively deep stagnant waterbody such as a lake, a dam reservoir, or a large-scale water tank by effectively supplying water with sufficient dissolved oxygen to a deep layer of a water body suffering from a low concentration of oxygen, thereby purifying water and improving water quality.

The construction of artificial-whirlpool generators according to first to fifth embodiments of the present invention are illustrated in FIGS. 5 to 12. Any of artificial-whirlpool generators 50 (hereinafter, reference number 50 that designates the generators will be omitted) according to these embodiments includes: a whirlpool generating member 51, 51-6, 51-7, or 51-8 having a water inlet 55, a whirlpool generating chamber 51a, and a whirlpool outlet 51b provided at a lower end; at least one position-fixing means 54 that fixes the whirlpool generating member 51, 51-6, 51-7, or 51-8 at a certain position in a waterbody (reference number 111 of FIGS. 15 and 18); and a swirling flow forming unit 52 and 53, 52-8 and 53-8, 52-9 and 53, or 52-8 and 53-14 that draws water from the waterbody into the whirlpool generating chamber 51a through the water inlet 15 by force, and rotates the water in one direction around an axle at the center of the whirlpool generating chamber 51a to form a whirlpool that descends toward to the whirlpool outlet 51b.

Figure 5:
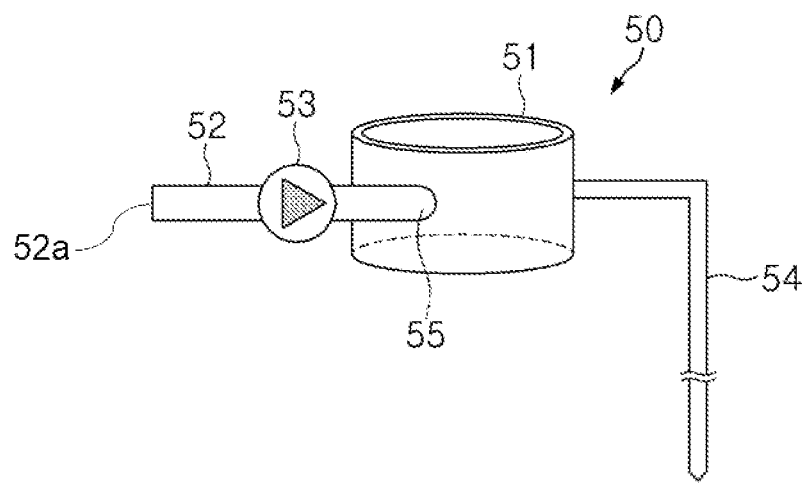
FIGS. 5 and 6 are diagrams illustrating an artificial-whirlpool generator according to a first embodiment.
Figure 6:
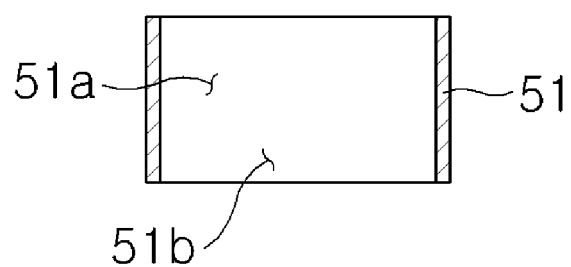

The artificial-whirlpool generator according to the first embodiment illustrated in FIGS. 5 and 6 is a type that has the whirlpool generating member 51 whose upper and lower ends are open. Since the whirlpool generating member 51 is entirely open at both of the upper end and the lower end 51b and has a circular cross section the diameter of which is uniform over its full length. The open upper end and the open lower end 51b of the whirlpool generating member 51 communicate with the whirlpool generating chamber 51a provided therein.

The position-fixing means 54 fixes the whirlpool generating member 51 such that the open upper end of the whirlpool generating member 51 is located above the surface of a waterbody and the open lower end serving as the whirlpool outlet 51b is located under the surface of the waterbody.

The swirling flow forming unit 52 and 53 includes at least one connection conduit or pipe 52 and a water feeding means 53. The connection pipe 52 is connected to a circumferential surface (outer surface) of the whirlpool generating member 51 in a tangential direction. The connection pipe 52 receives water through a suction mouth 52a submerged in the water, and guides the water in the surface portion of the waterbody to the whirlpool generating chamber 51a such that water is introduced into the whirlpool generating chamber 51a while deviating from the center (i.e. axle at the center) of the whirlpool generating chamber 51a. The water feeding means 53 forces water in the surface portion of the waterbody to flow into the connection pipe 52. Thanks to the water feeding means 53, the water in the surface portion of the waterbody can be continuously introduced into or supplied to the whirlpool generating chamber 51a through the connection pipe 52. The water introduced into the whirlpool generating chamber 51a swirls or rotates in a predetermined direction within the whirlpool generating chamber 51a due to the connection pipe 52 that is connected to the circumferential surface of the whirlpool generating member 51 in a tangential direction.

The whirlpool generating member 51 has the water inlet 55 that communicates with the whirlpool generating chamber 51a in the circumferential surface thereof. The connection pipe 52 is connected to the water inlet 55 formed in the circumferential surface of the whirlpool generating member 51.

The water feeding means 53 serves as a driving force providing means that provides force required to supply water of the waterbody to the whirlpool generating chamber 51a and to rotate the supplied water in one direction. The water feeding means 53 may be a motor pump connected to the connection pipe 52 or a recirculation pump arranged inside a connection portion (near the water inlet 55) between the whirlpool generating member 51 and the connection pipe 52. Alternatively, the water feeding means 53 may be an impeller that creates a water flow using blades and feeds water of the waterbody into the connection pipe 52 by force. In this case, the impeller serving as the water feeding means may be rotated by driving force transferred from a motor or by wind force.

In the embodiment described above, the swirling flow forming unit 52 and 53 includes both of the connection pipe 52 and the water feeding means (i.e. driving force providing means 53). However, the swirling flow forming unit may not include the connection pipe 52 but may have a structure in which one or more water inlets 55 are formed in the circumferential surface of the whirlpool forming member 51 so that water of the waterbody can be introduced into the whirlpool generating chamber 51a while deviating from the center (axis at the center) of the whirlpool generating chamber 51a, and the water feeding means such as a motor pump or a recirculation pump is arranged near the water inlet 55.

On the other hand, the whirlpool generating member 51 may not necessarily have a cylinder shape. Therefore, alternatively, the whirlpool generating member 51 may have a truncated cone shape or a jar shape. The shape of the whirlpool generating member 51 may not be limited as long as it has a circular cross section. The open upper end and the open lower end 51b of the whirlpool generating member 51 may have different sizes.

Figure 13:
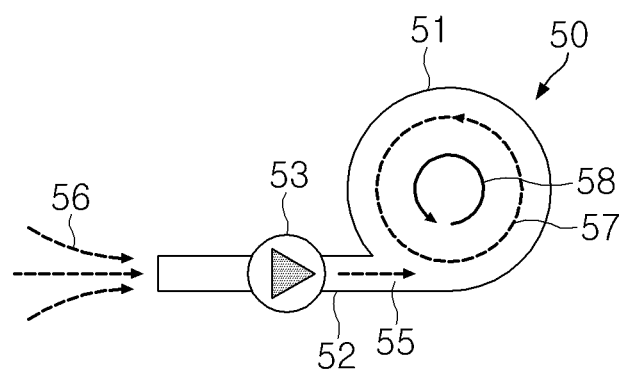
FIGS. 13 and 14 are schematic views illustrating a process of forming an artificial whirlpool using the artificial-whirlpool generator of the first embodiment illustrated in FIG. 5.
Figure 14:
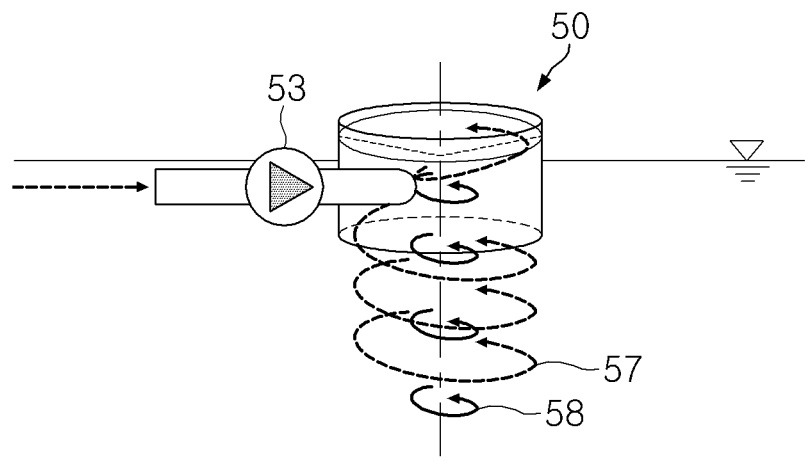

The process of forming an artificial whirlpool according to the first embodiment will be described below with reference to FIGS. 13 and 14. Water 56 in a surface layer (surface portion) of a waterbody is forced to move into the whirlpool generating chamber 51 having a circular cross section by action of the water feeding means 53 that serves as the driving force providing means, and the water introduced into the whirlpool generating chamber 51a is rotated in one direction by action of the connection pipe 52, forming a swirling flow, and the swirling flow formed in the whirlpool generating chamber 51a descends by flowing outside through the whirlpool outlet 51a that communicates with the whirlpool generating chamber 51a while the water 56 of the surface layer is continuously introduced into the whirlpool generating chamber 51a. The center of the descending swirling flow undergoes a low pressure state due to the action of centrifugal force thereof and the radius of rotation decreases toward the bottom. Therefore, the rotation speed of an inside swirling flow 58 becomes higher than that of an outside swirling flow 58 according to the preservation of moment of inertia, so that the descending swirling flow strongly moves toward the bottom of the waterbody while forming a whirlpool.

Figure 15:
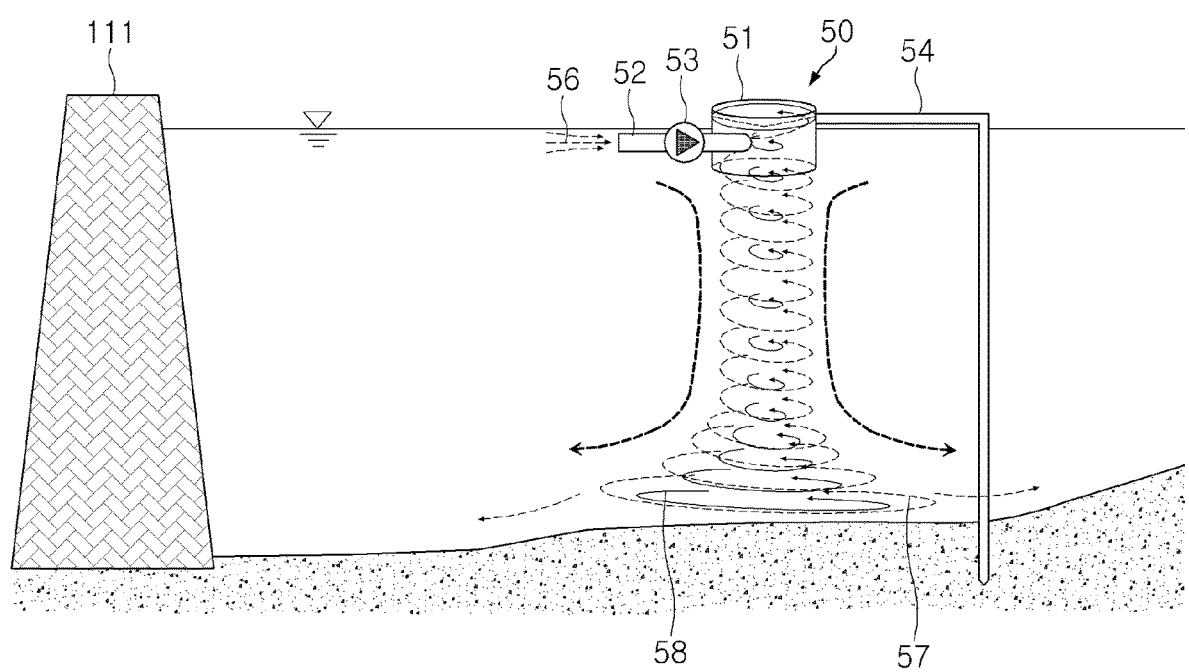
FIG. 15 is a diagram illustrating an example of use of the artificial-whirlpool generator according to the first embodiment illustrated in FIG. 5.

FIG. 15 illustrates a waterbody to which the first embodiment is applied. As illustrated in FIG. 15, in a water system of a dam 111 (or a waterbody such as a lake or a large-scale water tank), in a position at which the artificial-whirlpool generator according to the first embodiment is to be installed, a post-like pile is driven into the bed of the waterbody. The whirlpool generating member 51 is connected to the post-like pile using a connecting means such as an iron stand and a screw such that the open upper end of the whirlpool generating member 51 is located above the surface of water and the whirlpool outlet 51b is located under water. In this way, the position of the artificial-whirlpool generator according to the first embodiment is fixed.

The post-like pile and the connecting means (iron stand and screw) constitute a position-fixing means 54. The pile of the position-fixing means 54 may be connected to an outer portion of the whirlpool generating member 51.

When the artificial-whirlpool generator according to the first embodiment is operated, a whirlpool is formed so that water in a surface layer can be violently transferred to the bottom of the waterbody. Besides, water of the descending whirlpool collides with the bottom of the whirlpool generating chamber while swirling in the whirlpool generating member. Therefore, the water can be smoothly mixed with bottom water, thereby smoothly diffusing into surroundings. That is, the artificial-whirlpool generator according to the first embodiment can maintain an aerobic state in the bottom of a waterbody and recover an ecosystem due to continuous operation thereof.

The position-fixing means 54 of the first embodiment may change the position (height) of the whirlpool generating member 51 according to the change in the level of a water system. For example, the length of the post-like pile of the position-fixing means 54 can be changed. Alternatively, the position-fixing means 54 may be a type including a buoy installed on the water surface instead of a post-like pile.

Alternatively, the whirlpool generating member 51 may have a length by which a sufficient length of the open upper end thereof appears above the water surface to operate responding to the change in the level of a water system.

Figure 7:
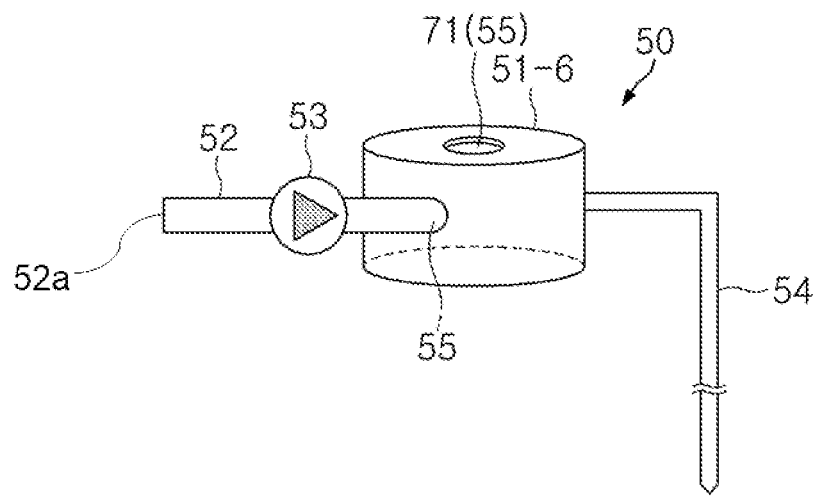
FIGS. 7 and 8 are diagrams illustrating an artificial-whirlpool generator according to a second embodiment.
Figure 8:
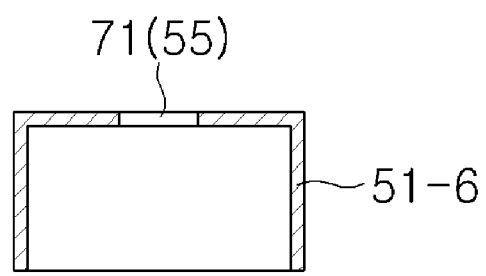

An artificial-whirlpool generator according to the second embodiment illustrated in FIGS. 7 and 8 is a type that has a whirlpool generating member 51-6 having an opening at an upper end thereof, the opening being smaller than that in the first embodiment. The construction and operation of the other components in the second embodiment are the same as those of the first embodiment.

As for the whirlpool generating member 51-6 according to the second embodiment, the upper end is covered with a plate-shaped cover having one or more openings 71. Alternatively, the cover with the opening 71 may be threedimensional and may take various forms (for example, a gourd shape). Further alternatively, a long cylinder may be inserted into the opening 71 of the whirlpool generating member 51-6.

The artificial-whirlpool generator according to the second embodiment can elastically and effectively respond to changes in the water level of a water system. According to the second embodiment, the whirlpool generating member 51-6 may be installed such that the entire body of the whirlpool generating member 51-6 including the upper end thereof is submerged. In this case, there is only one opening 71 at the center of the upper end of the whirlpool generating member 51-6 so that the opening 71 may serve as the water inlet 55.

Figure 16:
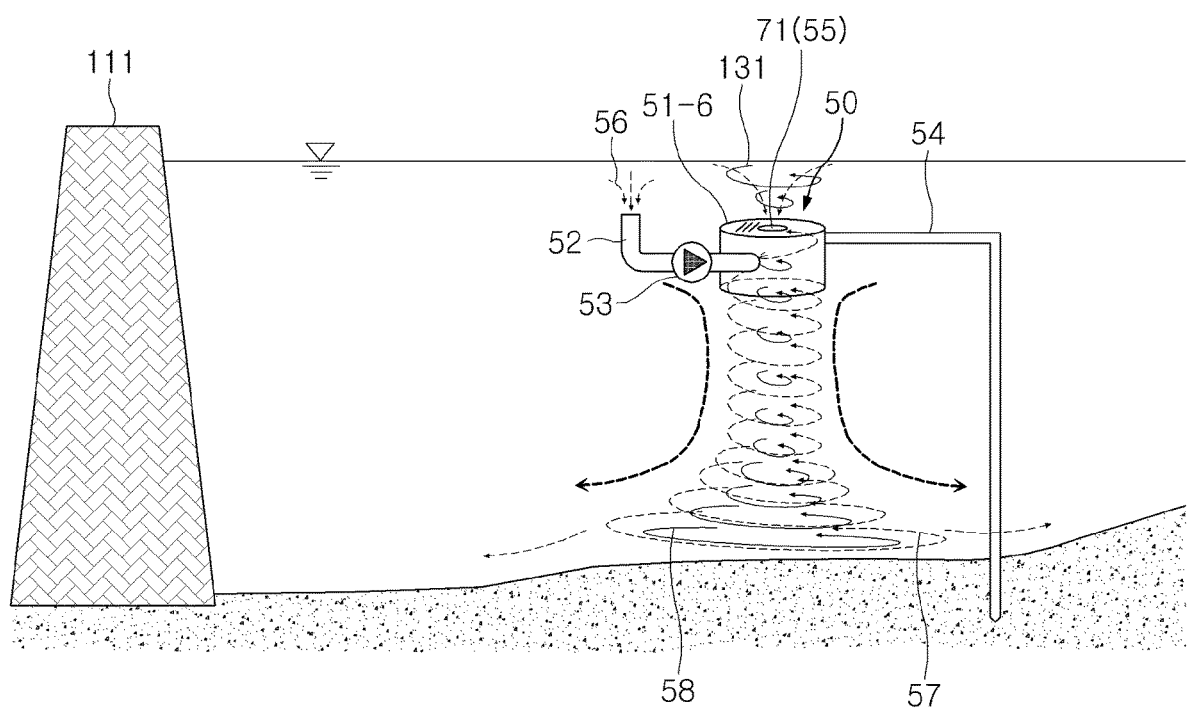
FIG. 16 is a diagram illustrating an example of use of the artificial-whirlpool generator according to the second embodiment illustrated in FIG. 7.

FIG. 16 illustrates a waterbody 111 to which the artificial-whirlpool generator according to the second embodiment is applied. FIG. 16 illustrates a state in which the whirlpool generating member 51-6 is installed to be entirely submerged and illustrates the flow of water. In the application example of the second embodiment illustrated in FIG. 16, a low pressure state attributable to the swirling flow does not occur near the opening 71 formed in the upper end of the whirlpool generating member 51-6. Therefore, a suctioning swirling flow 131 is formed in an upper layer of a water system and at an upper side of the whirlpool generating member 51-6. Water of the surface layer above the whirlpool generating member 51-6 is introduced into an internal space (whirlpool generating chamber) of the whirlpool generating member 51-6 through the water inlet 55 (i.e. the opening 71 of the whirlpool generating member 51-6) and then continuously moved to the bottom.

Figure 9:
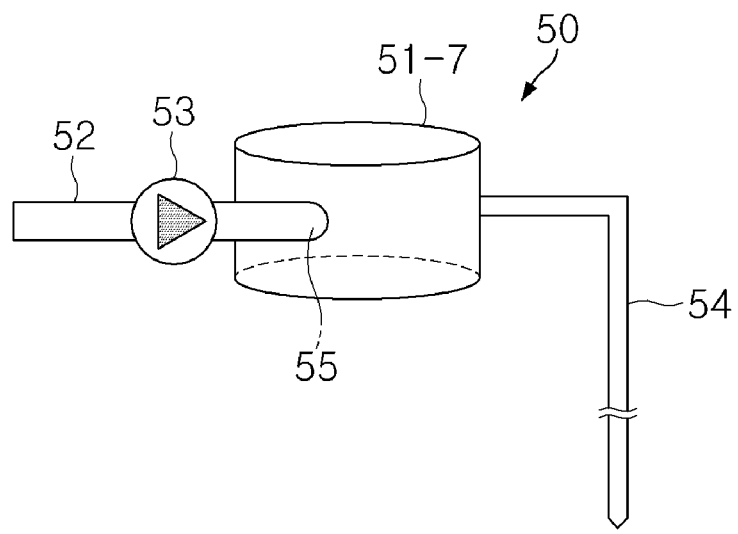
FIGS. 9 and 10 are diagrams illustrating an artificial-whirlpool generator according to a third embodiment.
Figure 10:
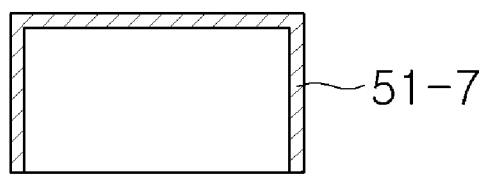

An artificial-whirlpool generator according to the third embodiment illustrated in FIGS. 9 and 10 is a type that has a whirlpool generating member 51-7 with a closed upper end. The construction and operation of the other components of the third embodiment are the same as those of the first embodiment. The third embodiment differs from the first embodiment only in that the whirlpool generating member 51-7 has a closed upper end.

In the third embodiment, since the upper end of the whirlpool generating member 51-7 is closed, water of a waterbody that is introduced into an internal space (i.e. whirlpool generating chamber) of the whirlpool generating member 51-7 through the connection pipe 52 and the water feeding means 53 is discharged only through an open upper end (i.e. whirlpool outlet) of the whirlpool generating member 51-7, the whirlpool generating member 51-7 may be entirely submerged. Therefore, the third embodiment may be free from the problems attributable to changes in the level of a waterbody.

Figure 17:
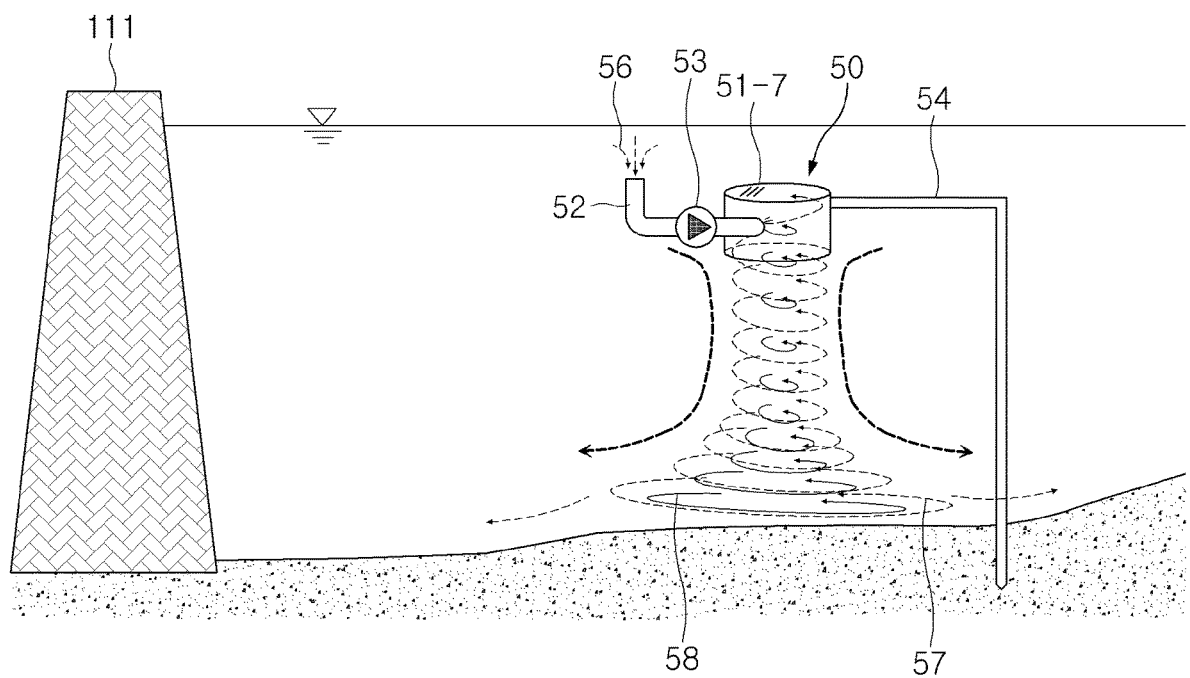
FIG. 17 is a diagram illustrating an example of use of the artificial-whirlpool generator according to the third embodiment illustrated in FIG. 9.

FIG. 17 illustrates a waterbody 111 to which the artificial-whirlpool generator according to the third embodiment is applied. FIG. 17 illustrates the flow of water and a state in which the whirlpool generating member 51-7 is entirely submerged.

Figure 11:
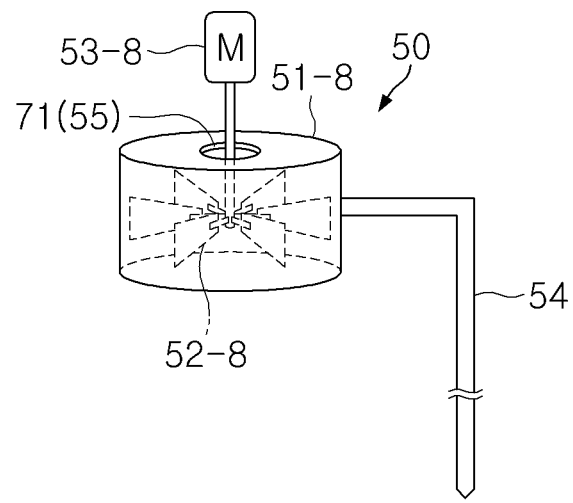
FIG. 11 is a diagram illustrating an artificial-whirlpool generator according to a fourth embodiment.

An artificial-whirlpool generator according to the fourth embodiment illustrated in FIG. 11 is a type that has a swirling flow forming units 52-8 and 53-8 equipped with an impeller. The construction and operation of the other components of the fourth embodiment are the same as those of the second embodiment. The fourth embodiment differs from the second embodiment only in that it includes an impeller 52-8 and a driving means 53-8 instead of the connection pipe (reference number 52 of FIG. 7) and the water feeding means (reference number 53 of FIG. 7).

The impeller 52-8 may be installed in the whirlpool generating chamber which is an internal space of the whirlpool generating member 51-8. The impeller 52-8 includes a shaft (rotational shaft) arranged to extend in a vertical direction and a plurality of blades arranged around the shaft in radial directions. In this case, the blades of the impeller 52-8 may be flat plate-shaped (pedal-type) blades that are not twisted. The shaft of the impeller 52-8 extends to the outside through the opening 71 formed in the upper end of the whirlpool generating member 51-8. The opening 71 of the whirlpool generating member 51-8 may be preferably arranged at the center of the whirlpool generating member 51-8. The opening 71 may serve as the water outlet 55.

The driving means 53-8 includes an electric motor that rotates the shaft of the impeller 52-8. The electric motor of the driving means 53-8 may be directly connected to an upper end (exposed end) of the shaft of the impeller 52-8 at the upper side of the whirlpool generating member 51-8. The driving means 53-8 transfers driving force of the electric motor to the shaft of the impeller 52-8 via a driving force transfer mechanism.

The driving means 53-8 may be rotated by wind force and transfers the generated rotation force to the impeller 52-8 instead of being rotated by an electric motor.

An artificial-whirlpool generator according to the fourth embodiment is installed such that the driving means 53-8 which serves as a driving force providing means is located above the water surface and that the whirlpool generating member 51-8 is submerged.

When the driving means 53-8 is operated, the impeller 52-8 is rotated at constant speed in one direction. The water in an internal space (whirlpool generating chamber) of the whirlpool generating member 51-8 comes to swirl by the action of the impeller 52-8, and water at the center of the swirling flow is pushed outward by centrifugal force of water. So a low pressure state occurs at the center of the swirling flow. At this point, water above and outside the whirlpool generating member 51-8 is introduced toward the center of the swirling flow, which is at a low pressure state through the opening 71 of the whirlpool generating member 51-8. After continuous operation of the driving means 53-8, water above the whirlpool generating member 51-8 is continuously introduced through the water inlet 55 that is the opening 71 of the whirlpool generating member 51-8, changing into a swirling flow and descending to the bottom while forming a whirlpool.

The fourth embodiment may be constructed based on the first or third embodiment, not on the second embodiment.

Figure 18:
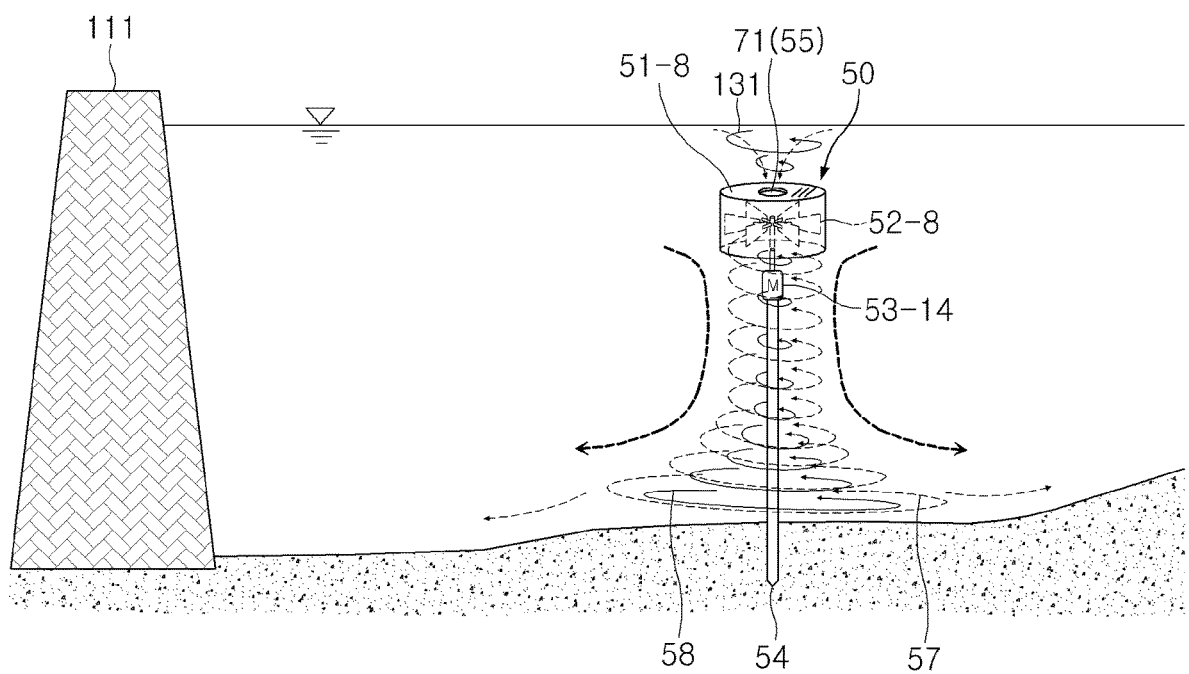
FIG. 18 is a diagram illustrating an example of use of the artificial-whirlpool generator according to the fourth embodiment illustrated in FIG. 11.

FIG. 18 illustrates a waterbody 111 to which a modification of the fourth embodiment is applied. As illustrated in FIG. 18, the modification of the fourth embodiment differs from the fourth embodiment illustrated in FIG. 11 only in that it includes a submersible motor 53-14 instead of the driving means (electric motor, etc., 53-8) of the fourth embodiment and a post-like pile that constitutes the position-fixing means 54 is arranged directly under the whirlpool generating member 51-8. The construction and operation of the modification of the forth embodiment are the same as those of the fourth embodiment. FIG. 18 illustrates the flow of water and a state in which the whirlpool generating member 51-8 according to the modification of the fourth embodiment and the swirling flow forming units 52-8 and 53-14 are located under the surface of water (i.e. submerged).

The submersible motor 53-14 is connected to a lower end of the shaft of the impeller 52-8 and arranged directly under the whirlpool generating member 51-8.

In the modification of the fourth embodiment, the post-like pile that constitutes the position-fixing means 54 is preferably arranged to be concentric with respect to the center (i.e. axle at the center) of the whirlpool generating chamber 51*a*. This arrangement can minimize interference between the post-like pile disposed directly under the whirlpool generating member 51-8 and a descending swirling flow and prevent impediment to improvement of water quality attributable to weakening of a whirlpool.

FIG. 18 illustrates a state in which the post-like pile 54 is connected to the submersible 53-14 via a connecting unit (a stand and a screw, etc.). Alternatively, an upper end of the post-like pile may be attached to the whirlpool generating member 51-8.

As described above, the structure in which the post-like pile 54 is arranged directly under the whirlpool generating member 51-8 and is concentric with respect to the center portion (axle at the center) of the whirlpool generating member 51-8 may be applied to the other embodiments.

Figure 12:
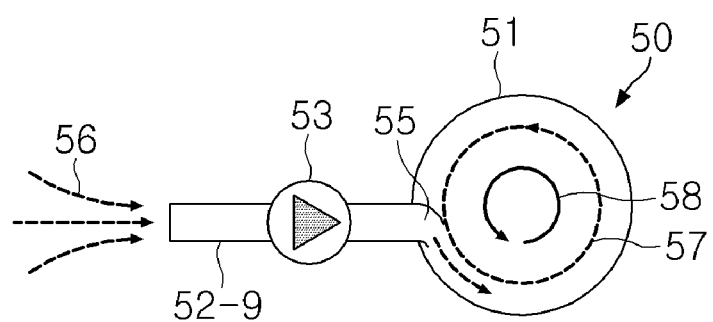
FIG. 12 is a diagram illustrating an artificial-whirlpool generator according to a fifth embodiment.

An artificial-whirlpool generator according to the fifth embodiment illustrated in FIG. 12 differs from those of the first to third embodiments in that a connection pipe 52-9 is connected to the circumferential surface of the whirlpool generating member 51 in any direction other than a tangential direction. In addition, a leading end (provided with an outlet) of the connection pipe 52-9 is inserted into the whirlpool generating member 51 in a horizontal direction, and the leading end of the connection pipe 52-9 is bent in one direction such that the outlet is directed toward the wall of the whirlpool generating member 51 (i.e. wall of the whirlpool generating chamber). This teaches that a swirling flow can be formed in the whirlpool generating member 51 (the whirlpool generating chamber).

Although the construction of an apparatus and the process according to the present invention has been described above, the present invention is not limited to embodiments disclosed in the present specification or the attached drawings. Embodiments of the present invention may be modified such that apparatuses or processes disclosed in the present specification can be combined in various ways, a plurality of apparatuses may be collectively or discretely installed, or a plurality of apparatus that rotate in different directions may be combined to cancel the torque.

What is claimed is:

1. A whirlpool generator to generate an artificial-whirlpool to a waterbody, comprising:
   a whirlpool generating member, the whirlpool generating member including a whirlpool generating chamber extending in a vertical center axis and having a cylindrical inner chamber surface, the whirlpool generating chamber having an open upper end and an open bottom end, and a connection conduit having a water inlet formed through a side surface of the whirlpool generating chamber and directed transversely in a tangential direction of the whirlpool generating chamber; and
   a water feeder coupled to the water inlet of the whirlpool generating chamber to provide a pressurized water stream through the tangentially directed water inlet of the whirlpool generating chamber, and thus generating a swirling water flow rotating about the vertical center axis of the whirlpool generating chamber around the cylindrical inner chamber surface of the whirlpool generating chamber, and the swirling water flow forming a whirlpool directing downward through the open bottom end of the whirlpool generating chamber and descending toward a bottom side of a waterbody, and thus, enhancing a water quality and a level of dissolved oxygen in the water body,
   wherein a suction mouth of the connection conduit is located inside of the water body, and the water feeder is located at an intermediate position between the suction mouth and the whirlpool generating chamber,
   wherein the open upper end of the whirlpool generating chamber is exposed from the surface of the waterbody, and the open bottom end is submerged in the waterbody.

2. The whirlpool generator according to claim 1, further comprising a position fixing member which fixes the whirlpool generating member to a predetermined location in the waterbody.

3. The whirlpool generator according to claim 2, wherein the position fixing member includes a fixing pole for affixing the whirlpool generating member to a bed surface of the waterbody.

4. The whirlpool generator according to claim 1, wherein the water feeder includes a motor pump or a recirculation pump connected to the connection conduit coupled to the water inlet of the whirlpool generating chamber, or an impeller that creates a water flow to feed into the connection conduit coupled to the water inlet of the whirlpool generating chamber.

5. A whirlpool generator to generate an artificial-whirlpool to a waterbody, comprising:
   a whirlpool generating member, the whirlpool generating member including a whirlpool generating chamber extending in a vertical center axis and having a cylindrical inner chamber surface, the whirlpool generating chamber having a partially closed or completely closed upper end and an open bottom end, and a connection conduit having a water inlet formed through a side surface of the whirlpool generating chamber and directed transversely in a tangential direction of the whirlpool generating chamber; and
   a water feeder coupled to the water inlet of the whirlpool generating chamber to provide a pressurized water stream through the tangentially directed water inlet of the whirlpool generating chamber, and thus generating a swirling water flow rotating about the vertical center axis of the whirlpool generating chamber around the cylindrical inner chamber surface of the whirlpool generating chamber, and the swirling water flow forming a whirlpool directing downward through the open bottom end of the whirlpool generating chamber and descending toward a bottom side of a waterbody, and thus, enhancing a water quality and a level of dissolved oxygen in the water body,
   wherein a suction mouth of the connection conduit is located inside of the water body, and the water feeder is located at an intermediate position between the suction mouth and the whirlpool generating chamber,
   wherein both the partially closed or completely closed upper end and the open bottom end of the whirlpool generating chamber are submerged in the waterbody.

6. The whirlpool generator according to claim 5, further comprising a position fixing member which fixes the whirlpool generating member to a predetermined location in the waterbody.

* * * * *